United States Patent
Fischer et al.

(10) Patent No.: US 11,775,310 B2
(45) Date of Patent: Oct. 3, 2023

(54) DATA PROCESSING SYSTEM HAVING DISTRUBUTED REGISTERS

(71) Applicant: NXP B.V., Eindhoven (NL)

(72) Inventors: Michael Andrew Fischer, San Antonio, TX (US); Kevin Bruce Traylor, Leander, TX (US)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 17/455,070

(22) Filed: Nov. 16, 2021

(65) Prior Publication Data
US 2023/0153114 A1    May 18, 2023

(51) Int. Cl.
*G06F 13/14* (2006.01)
*G06F 9/38* (2018.01)
*G06F 9/30* (2018.01)
*G06F 13/28* (2006.01)
*G06F 7/575* (2006.01)
*G06F 7/544* (2006.01)

(52) U.S. Cl.
CPC .......... *G06F 9/3867* (2013.01); *G06F 7/5443* (2013.01); *G06F 7/575* (2013.01); *G06F 9/3012* (2013.01); *G06F 13/28* (2013.01)

(58) Field of Classification Search
CPC .... G06F 9/3867; G06F 9/3012; G06F 7/5443; G06F 7/575; G06F 13/28
See application file for complete search history.

(56) References Cited

U.S. PATENT DOCUMENTS

| | | | |
|---|---|---|---|
| 5,574,927 A | 11/1996 | Scantlin | |
| 7,533,382 B2 * | 5/2009 | Karim | G06F 9/4843 |
| | | | 712/32 |
| 8,082,423 B2 * | 12/2011 | Abernathy | G06F 9/3859 |
| | | | 712/218 |
| 9,367,462 B2 * | 6/2016 | Potkonjak | G06F 12/084 |
| 9,633,411 B2 * | 4/2017 | Du | G06T 1/60 |
| 10,423,415 B2 * | 9/2019 | Appu | G06F 1/3275 |
| 2004/0030873 A1 * | 2/2004 | Park | G06F 9/30141 |
| | | | 712/E9.023 |

(Continued)

OTHER PUBLICATIONS

ARM: "Arm Architecture Reference Manual," version 5, ARM DDI 0100E, ARM DDI 0100E, Jun. 2000, pp. A3-25, A3-26, A4-20, A4-28, A4-48, A4-52, ARM Limited, UK.

(Continued)

*Primary Examiner* — Cheng Yuan Tseng

(57) ABSTRACT

A processing system includes a system interconnect, a processor coupled to communicate with other components in the processing system through the system interconnect, distributed general purpose registers (GPRs) in the processing system wherein a first subset of the distributed GPRs is located in the processor and a second subset of the distributed GPRs is located in the processing system and external to the processor, and a first set of conductors directly connected between the processor and the second subsets of the distributed GPRs. An instruction execution pipeline in the processor accesses any register in the first and second subsets of the distributed GPRs as part of the processor's GPRs during instruction execution in the processor, in which the second subset of the distributed GPRs is accessed through the first conductor.

12 Claims, 3 Drawing Sheets

(56) References Cited

U.S. PATENT DOCUMENTS

| | | | | |
|---|---|---|---|---|
| 2014/0331025 A1* | 11/2014 | Kwon | ................... | G06F 9/3889 |
| | | | | 712/20 |
| 2015/0177821 A1* | 6/2015 | Senthinathan | ........ | G06F 9/3887 |
| | | | | 713/324 |
| 2021/0398339 A1* | 12/2021 | Hong | ................... | G06F 9/3851 |

OTHER PUBLICATIONS

Dolle et al.: "A Cost-Effective RISC/DSP Microprocessor for Embedded Systems," IEEE Micro, vol. 15, Issue: 5, Oct. 1995, pp. 32-40.
U.S. Appl. No. 17/586,708, Fisher, Michael Andrew: "Selectable Register File Blocks for Hardware Threads of a Multithreaded Processor", filed Jan. 27, 2022.

* cited by examiner

DATA PROCESSING SYSTEM HAVING DISTRUBUTED REGISTERS

BACKGROUND

Field

This disclosure relates generally to data processing systems, and more specifically, to a data processing system having distributed general purpose registers (GPRs).

Related Art

Processors, especially those used for embedded control, frequently require the use of the contents of peripheral device registers or coprocessor registers. However, in order for a processor to access data located outside the processor, such as in these peripheral device registers or coprocessor registers, the data must be transferred to and from registers of the processor through the use of load and store instructions. Also, additional instructions are typically required to calculate addresses for the data transfers for use by the load and store instructions. Furthermore, this data is typically transferred on a peripheral bus by way of a bus bridge, in which the peripheral bus runs at a fraction of the clock rate of the processor's primary data bus, thereby stalling the processor for many cycles while traversing the bus bridge. Therefore, it is inefficient in terms of both time and power for such processors to access required peripheral or coprocessor data. While the use of data caches may mitigate this inefficiency by reducing access times for the data transfers, often peripheral registers or coprocessor registers themselves are not cacheable. In addition, many low-end embedded controllers do not include caches in order to reduce size, cost, and power consumption. Therefore, a need exists for improved access to data required by the processor.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

In one aspect, a technique which allows a processor to access some peripheral registers or coprocessor registers directly as operands can improve the efficiency of low-level embedded controllers. In doing so, performance is improved due to elimination of processor and memory bus cycles typically required to access these registers using load and store instructions. For this technique, the general purpose registers (GPRs) of the processor are modified to be implemented as distributed GPRs, in which a first portion of the processor GPRs is physically located within the processor, while one or more other portions of the processor GPRs are located elsewhere in the data processing system, external to the processor, such as, for example, within a peripheral device, within a coprocessor, or within another processor of the data processing system. In this manner, source and destination register specifiers used during instruction execution by the processor can specify registers in the one or more other portions of the distributed GPRs in addition to those in the first portion. This allows, for example, the processor to access any of the registers to obtain operands or receive results during instruction execution.

Figure 1:
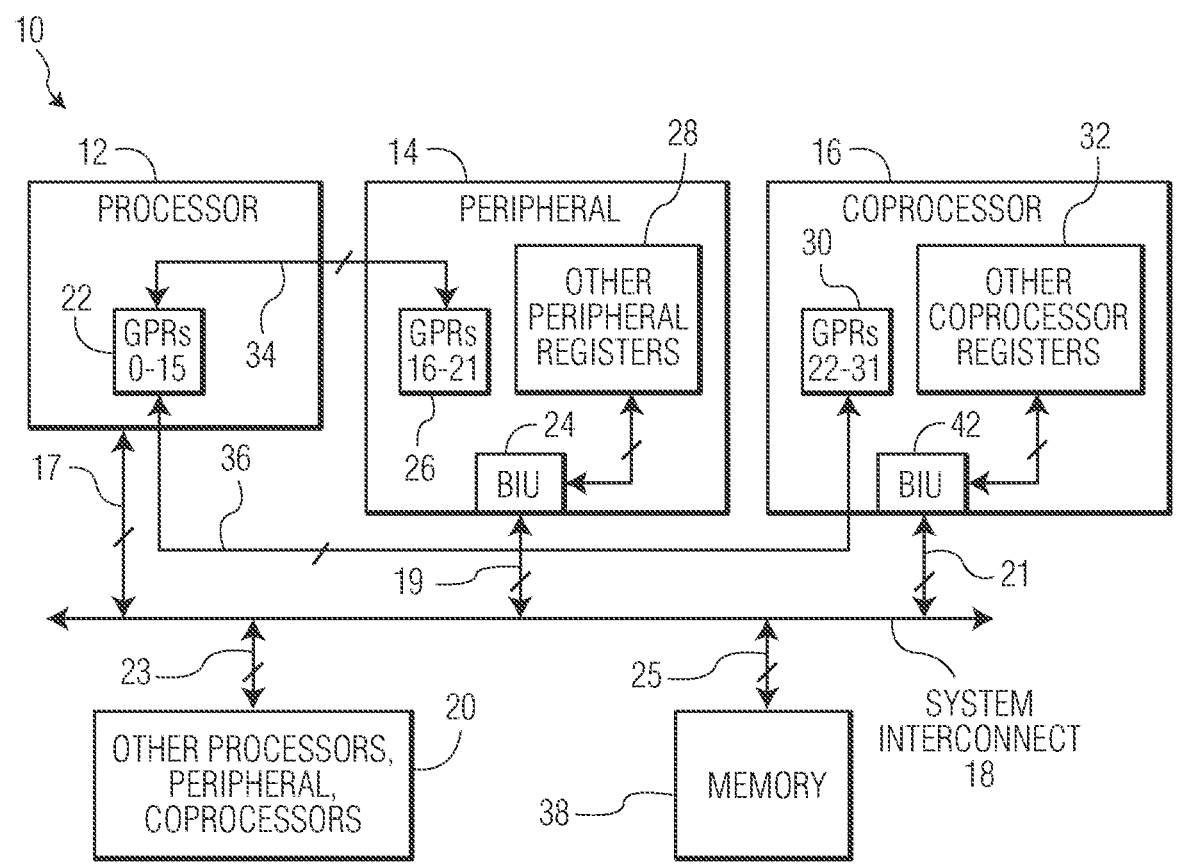
FIG. 1 illustrates, in block diagram form, a data processing system in accordance with one embodiment of the present invention.

FIG. 1 illustrates, in block diagram form, a data processing system 10 in accordance with one embodiment of the present invention. Data processing system 10 includes a processor 12, a system interconnect 18, a peripheral 14, a coprocessor 16, a memory 38, and any other processors, peripherals, coprocessors 20. System interconnect 18 can be any type of system interconnect, such as, for example, a system bus, a crossbar switch, or any type of interconnect fabric. Processor 12 is coupled to system interconnect 18 by way of bidirectional conductors 17, peripheral 14 is coupled to system interconnect 18 by way of bidirectional conductors 19, coprocessor 16 is coupled to a system interconnect 18 by way of bidirectional conductors 21, memory 38 is coupled to system interconnect 18 by way of bidirectional conductors 25, and any other processors, peripherals, coprocessors 20 can each be coupled to system interconnect 18 by way of a corresponding set of bidirectional conductors, illustrated collectively as conductors 23. Note that memory 38 can be any type of memory, peripheral 14 can be any type of peripheral, and coprocessor 16 can be any type of coprocessor. Similarly, processor 12 can be any type of processor. In one embodiment, processor 12 implements a Reduced instruction Set Computer (RISC) architecture, and may therefore be referred to as a RISC processor. Note that data processing system 10 may include additional or fewer elements than those illustrated in FIG. 1.

Processor 12 includes a set of distributed processor GPRs 50 (illustrated in FIG. 2), which includes, in one embodiment, 32 GPRs, referred to as GPRs 0-31. However, a first portion 22 of the GPRs (with GPRs 0-15) is located within processor 12, while other portions (portions 26 and 30) are located external to processor 12. For example, portion 26 of the processor GPRs (with GPRs 16-21) is located within peripheral 14 and is thus accessible by circuitry within peripheral 14, and portion 30 of the GPRs (with GPRs 22-31) is located within coprocessor 16 and is thus accessible by circuitry within coprocessor 16. In one embodiment, distributed processor GPRs 50 (which includes portions 22, 26, and 30) are implemented as an array of flip flops in which multiplexers (MUXes) control access and data routing to the flip flops. For example, GPRs 0-15 may be implemented with 512 flip flops in processor 12, while GPRs 16-31 may be implemented with another 512 flop flops, distributed as needed in peripheral 14 and coprocessor 16. Alternatively, different implementations may be used for distributed processor GPRs 50. Therefore, portion 22 of distributed processor GPRs 50 is directly connected to portion 26 of distributed processor GPRs 50 by way of conductor 34, and portion 22 of distributed processor GPRs 50 is directly connected to portion 30 of distributed processor GPRs 50 by way of conductor 36. Each of conductors 34 and 36 correspond to a dedicated, low-latency data port of processor 12 to implement the distributed processor GPRs. In this manner, processor 12 can access any of portions 22, 26, and 30 with the same efficiency. In alternate embodiments, the distributed nature of distributed processor GPRs 50 can be achieved in different ways. For example, if GPRs 0-31 are implemented with a total of 1024 flip flops, all of the 1024 flip flops may be located within processor 12, in which the distributed nature can be achieved through the direct connections to the peripheral or coprocessor to allow direct access to any of the distributed GPRs.

As will be described further in reference to FIG. 2, distributed processor GPRs 50 of processor 12, including portions 22, 26, and 30, is logically implemented within the instruction pipeline of processor 12 and is thus accessible by the execution units and load/store units of the instruction pipeline, as needed, to execute any of the processor instructions of processor 12 (as defined by the instruction set architecture (ISA) of processor 12). For example, processor 12 can access the contents of any of the GPRs in distributed processor GPRs 50 for direct use as ALU operands or as direct destinations for ALU results.

As illustrated in FIG. 1, peripheral 14, in addition to portion 26, also includes other peripheral registers 28 which are coupled to a bus interface unit (BIU) 24 of peripheral 14. Similarly, coprocessor 16, in addition to portion 30, also includes other coprocessor registers 32 which are coupled to a BIU 42 of coprocessor 16. BIU 24 is coupled to system interconnect 18 via conductors 19, and BIU 42 is coupled to system interconnect 18 via conductors 21. Therefore, while the contents of any of GPRs 16-21 in peripheral 14 are directly accessible as part of the processor GPRs during instruction execution in processor 12, the contents of other peripheral registers 28 are only accessible via BIU 24 over system interconnect 18, and require the execution of load instructions in processor 12 to bring in the contents of any of these other peripheral registers 28 into a GPR of processor 12 and store instructions to write contents of a GPR into any of these other peripheral registers 28. Same is true for other coprocessor registers 32, whose contents are only accessible via BIU 42 over system interconnect 18, requiring the execution of load/store instructions in processor 12.

Therefore, to access any contents in other peripheral registers 28 or other coprocessor registers 32, execution of a minimum of three processor instructions is typically required in processor 12. These include a load instruction to read from one of the other registers (in registers 28 or 32) into a processor GPR, an instruction to perform a desired operation on the data, and a store instruction to store the resulting data back to one of the other registers (in registers 28 or 32). Also, the execution of these instructions, especially load instructions, are likely to incur wait states (causing pipeline stalls in the processor) due to, for example, contention for the system interconnect, delays in response by the peripheral or coprocessor, delays through bus bridges, etc., or combinations thereof. Furthermore, in many cases, load/store addresses are generated relative to a base register, so a GPR may need to be loaded with a base address near the address assigned to the peripheral register so that the load or store can generate an appropriate address, requiring execution of additional instructions, as well as the use of at least one more GPR, in order to access the peripheral register. Therefore, accessing the contents in other peripheral or coprocessor registers, outside of distributed processor GPRs 50, requires longer latency due, for example, to extra processor and bus cycles for executing the additional instructions, as compared to directly accessing any of the GPRs in distributed processor GPRs 50.

Figure 2:
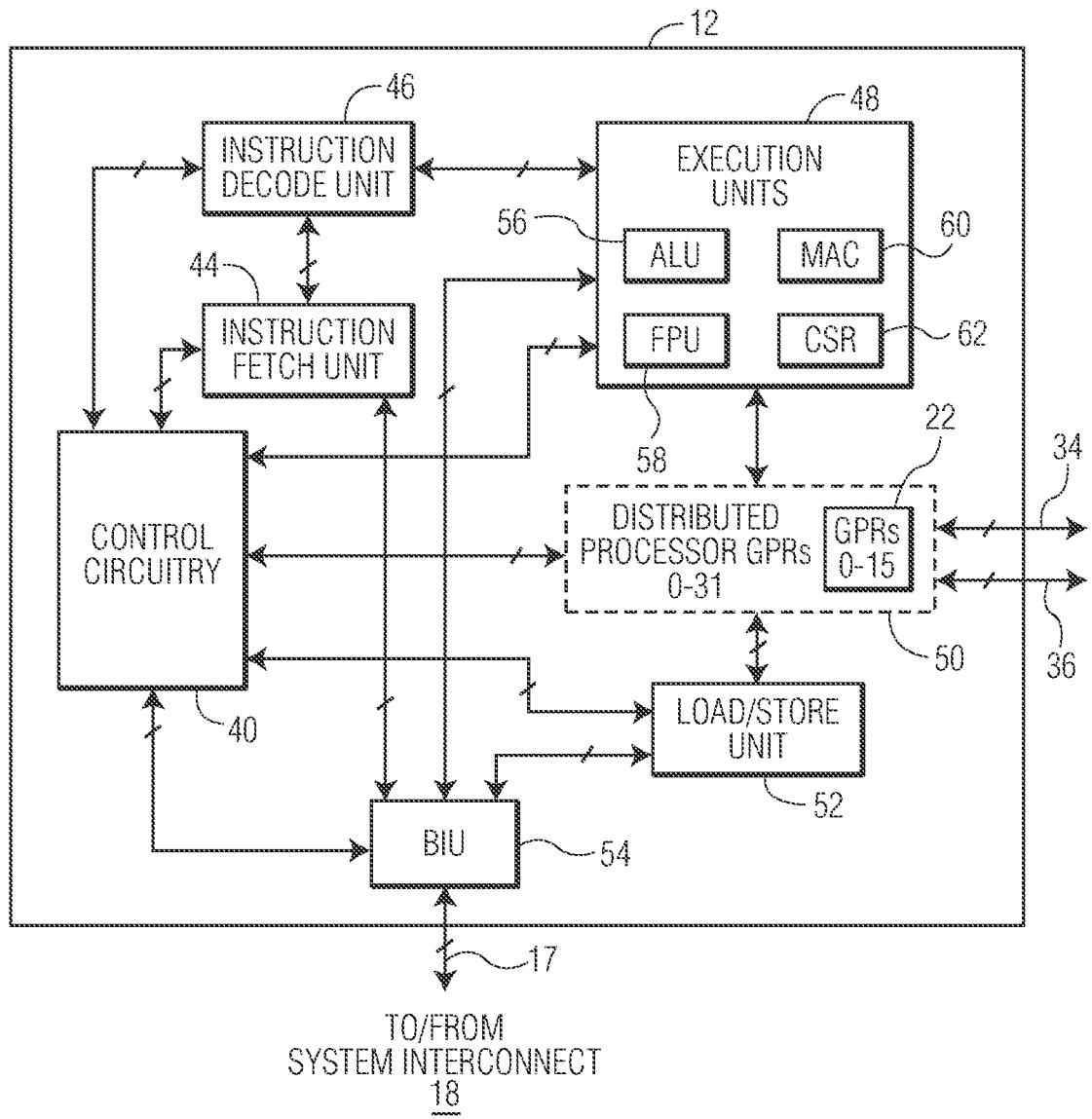
FIG. 2 illustrates, in block diagram form, a processor of the data processing system of FIG. 1 having distributed GPRs, in accordance with one embodiment of the present invention.

FIG. 2 illustrates, in block diagram form, an exemplary architecture of processor 12. Processor 12 includes a BIU 54, control circuitry 40, an instruction fetch unit 44, an instruction decode unit 46, execution units 48, a load/store unit 52, and distributed processor GPRs 50. System interconnect 18 is coupled to BIU 54 by way of conductors 17. Instruction fetch unit 44 is bidirectionally coupled to instruction decode unit 44, which is bidirectionally coupled to execution units 48. Execution units 48 and load/store unit 52 are each bidirectionally coupled with distributed processor GPRs 50. Note that, as described in reference to FIG. 1, distributed processor GPRs 50 is a logical construct, as denoted by the dashed box in FIG. 2. That is, physically, distributed processor GPRs 50, although accessible as part of the instruction pipeline of processor 12, may be located anywhere throughout data processing system 10. As illustrated in FIG. 2, distributed processor GPRs 50 includes distributed portions 22, 26, and 30, in which portion 22 is located within processor 12 (while portion 26 is located in or close to peripheral 14, and portion 30 is located in or close to coprocessor 30). Processor 12 includes two external data ports connected to conductors 34 to access portion 26 and to conductors 36 to access portion 30. Control circuitry 40 is bidirectionally coupled to each of instruction fetch unit 44, instruction decode unit 46, execution units 48, load/store unit 52, distributed processor GPRs 50, and BIU 54. Execution units 48, instruction fetch unit 44, and load/store unit 52 are also each bidirectionally coupled to BIU 54, since these units may require obtaining or providing data via system interconnect 18.

In operation, instruction fetch unit 44, instruction decode unit 46, execution units 48, distributed processor GPRs 50, and load/store unit 52, under the control of control circuitry 40, implement the instruction execution pipeline of processor 12. The instructions executed by the instruction execution pipeline are defined by the ISA of processor 12, and, in one embodiment, the instruction execution pipeline includes a fetch stage, a decode stage, one or more execution stages, and a writeback stage. Processor instructions are fetched during the fetch stage by instruction fetch unit 44 by way of BIU 54 and system interconnect 18 (from, e.g., memory 38). Fetched instructions are provided to instruction decode unit 46, which decodes the instructions during the decode stage. Control circuitry 40 and instruction decode unit 46 control execution units 48 and load/store unit 52, as needed, and access distributed processor GPRs 50, as needed, to execute the decoded instructions during the one or more execute stages. The results of the executed instructions may be written back to distributed processor GPRs 50 during the writeback stage. Note that this is a very high level description of the instruction pipeline, and in different embodiments, may include additional stages and circuitry, as needed, depending on the ISA and the functionality of the pipeline.

Execution units 48 include an arithmetic-logic unit (ALU) 56 (for performing arithmetic and logic operations), a multiply-accumulate unit (MAC) 60 (for performing multiply-accumulate operations), a floating point unit (FPU) 58 (for performing operations on floating point numbers), and a conditional status register unit 62 (for performing comparison operations). Alternatively, execution units 48 may include more or fewer different types of execution units, as needed. As a result of decoding instructions, if operands are needed from a source address location, load/store unit 52 obtains the operands by way of BIU 54 and system interconnect 18 and stores them into a processor GPR. Similarly, if data is to be written to a destination address location, load/store unit 52 provides the data by way of BIU 54 and system interconnect 18. Instructions can also explicitly identify any GPR in distributed processor GPRs 50, by register number (e.g., 0-31), as a source register to provide source operands for any of the execution units or as a destination register to receive results from any of the execution units.

In one embodiment, distributed processor GPRs 50 can be implemented without modifying the ISA of processor 12, allowing processor instructions to be decoded and executed in their normal manner, in which the contents of any of the GPRs within distributed processor GPRs 50 can be read in the appropriate pipeline stage, and results can be stored to the distributed processor GPRs 50 during writeback in the appropriate pipeline stage. In one embodiment, the register address space is subdivided to identify multiple portions of the distributed processor GPRs by using one or more bit positions of the register specifier. For example, in the case of the distributed processor GPRs including two portions of 16 registers each (GPRs 0-15 and GPRs 16-31), the most-significant bit of the register specifier can be used to distinguish between the two portions. Alternatively, other methods may be used to differentiate the different GPR portions.

In one embodiment, processor 12 is a RISC processor which implements the RISC-V ISA. For many ISAs, allocating half of the GPRS would require modifying the compiler code generators so that they do not allocate temporary registers in the distributed portions assigned for use by the peripheral or coprocessor. However, in the RISC-V ISA, such a modification is not necessary. In a RISC-V processor, the register specifiers are five bits wide, corresponding to 32 GPRs being addressed. There are two standardized versions of the base ISA, which differ solely by their register architecture, in which one is the RV32I with 32 GPRs and the other is RV32E with only 16 GPRs. The machine instructions are all identical in RV32I and RV32E, and the compilers and other software development tools directly support both. Therefore, by having the compiler generate code for RV32E, processor GPRs 16-31 will never be allocated by the compiler to hold variables or intermediate results, and therefore will be left available for peripheral or coprocessor use without requiring changes to the instruction set or the program development tools. While the compiler will not generate references to GPRs 16-31 when compiling for RV32E, the peripheral or coprocessor registers that occupy those register addresses can still be accessed from programs written in assembly language, or using intrinsics from compiled code.

Referring back to the illustrated embodiments of FIGS. 1 and 2, GPRs 0-15 in portion 22 are reserved for compiled code for processor 12, while GPRs 16-21 of portion 26 are available for use by peripheral 14, and GPRs 22-31 of portion 30 are available for use by coprocessor 16. As mentioned above, peripheral 14 can be any type of peripheral and coprocessor 16 can be any type of coprocessor. Additionally, a peripheral may, in some cases, be referred to as a coprocessor, and vice versa. Examples for peripheral 14 or coprocessor 16 include an encryption engine, a transmitter/receiver of a wireless controller (e.g. Bluetooth, Zigbee), a DMA engine, a data converter (e.g. audio data converter), etc.

Figure 3:
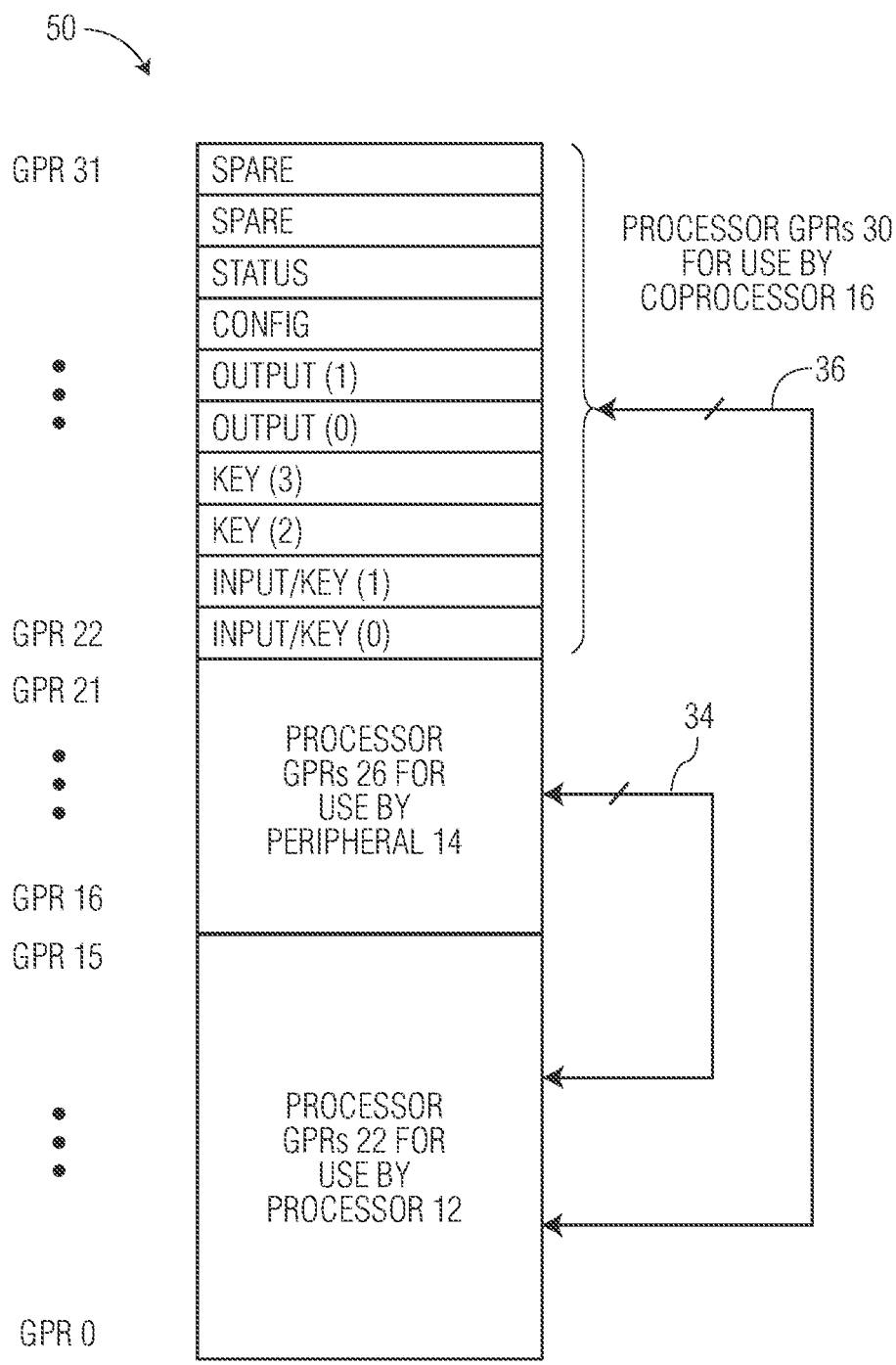
FIG. 3 illustrates, in diagrammatic form, the distributed GPRs of FIGS. 1 and 2, in accordance with one embodiment of the present invention.

FIG. 3 illustrates, in diagrammatic form, one example of distributed processor GPRs 50, in which coprocessor 16 is an encryption engine. In this example, portion 30 with GPRs 22-31 is allocated for use by coprocessor 16, but is accessible during instruction execution in processor 12 as part of distributed processor GPRs 50. Note that portion 30 is connected to portion 22 by way of conductor 36. In this example, eight of the registers in portion 30 (GPRs 22-29) are used by the encryption engine, leaving two spare unused GPRs. Alternatively, portion 30 may only include eight registers, and not have any spares.

In the example of FIG. 3, portion 30 with GPRs 22-31 is used to hold values of relevance to the encryption engine, including two registers to hold a 64-bit output code block, two registers to hold a 64-bit input code block, and four registers to hold the 128-bit key (two of which are shared with the input code block). In this example, by using portion 30 with GPRs 22-31, there are no cycles wasted passing input data to the encryption engine or output data from the encryption engine. Loads from the source buffer in memory (e.g. memory 38) can go directly into input registers of portion 30 (e.g. GPRs 22 and 23), and stores to the result buffer in memory (e.g. memory 38) can come directly from the output registers of portion 30 (e.g. GPRs 26 and 27). In one embodiment, the act of writing to the input register GPR 23 can trigger processing by the encryption engine of the next code block. Any additional processing can also be performed by processor 12 making direct references to the input and output registers of portion 30, without the need to first move any of the values to or from GPRs of processor 12 (in portion 22). Furthermore, conditions indicated in the status register (in GPR 29 of portion 30) can be tested directly using logical instructions and condition branch instructions, without needing to first load the status from the encryption engine into a GPR of processor 12 (in portion 22). Because accessing GPRs in portion 30 does not consume cycles on system interconnect 18, more bus bandwidth may be available for accessing the data being processed. Also because fewer instructions are executed by processor 12, the cryptographic throughput from the encryption engine is higher and power consumption is lower.

Note that, as in the above example, the act of reading or writing a particular GPR in a distributed portion of the GPRs belonging to a peripheral or coprocessor can trigger actions in that peripheral or coprocessor. Note also that, in the above example, the size of each register in distributed processor GPRs 50 is 32 bits. However, in alternate embodiments, note that size of the registers in the distributed GPRs can be larger or smaller than 32 bits. Although the embodiments herein have been described with each distributed portion of GPRs including contiguous GPRs, that is not necessary. For example, portion 22 may includes GPRs 0-15 and GPRs 30-31, in which portion 30 would only include GPRs 22-29.

Therefore, by now it can be understood how a set of distributed processor GPRs logically belonging to a processor but physically distributed within the data processing system, external to the processor, such as, for example, in one or more peripherals, in one or more coprocessors, or even in other processors or cores of the data processing system can improve processing efficiency. Those GPRs that are distributed external to the processor can be used and accessed directly by the peripheral or coprocessor, as well as by instructions executing within the processor. In this manner, the contents of these distributed GPRs are easily accessible, as needed, by the various execution units of the processor. As a result, performance may be improved due to the reduction of processor and memory cycles to access content within the peripherals or coprocessors, since the content can be accessed directly via the distributed GPRs without needing additional load and store instructions to transfer the content. Code density may also be improved, since there is a lesser need for load and store instructions, as well as a lesser need for additional instructions to load the addresses of other peripheral or coprocessor registers into the GPRs of the processor for use as a base addresses by load and store instructions. Instruction processing overhead may also be further reduced due to the ability to trigger actions in a coprocessor or peripheral by the act of reading or writing particular GPRs. Power consumption may also be reduced because fewer instructions are fetched and executed and fewer data bus cycles are performed.

As used herein, the term "bus" or "interconnect" is used to refer to a plurality of signals or conductors which may be used to transfer one or more various types of information, such as data, addresses, control, or status. The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Some of the above embodiments, as applicable, may be implemented using a variety of different data processing systems. For example, although FIG. 1 and the discussion thereof describe an exemplary data processing system architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality.

Also for example, in one embodiment, the illustrated elements of system 10 are circuitry located on a single integrated circuit or within a same device. Alternatively, system 10 may include any number of separate integrated circuits or separate devices interconnected with each other. For example, memory 38 may be located on a same integrated circuit as processor 12 or on a separate integrated circuit or located within another peripheral or slave discretely separate from other elements of system 10.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the invention is described herein with reference to specific embodiments, various modifications and changes can be made without departing from the scope of the present invention as set forth in the claims below. For example, data processing system 10 may include multiple cores or processors, each having its corresponding set of distributed processor GPRs. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

The following are various embodiments of the present invention.

In one embodiment, a processing system includes a system interconnect; a processor coupled to communicate with other components in the processing system through the system interconnect; distributed general purpose registers (GPRs) in the processing system, wherein a first subset of the distributed GPRs is located in the processor and a second subset of the distributed GPRs is located in the processing system and external to the processor; a first set of conductors directly connected between the processor and the second subsets of the distributed GPRs; and an instruction execution pipeline in the processor, wherein the instruction execution pipeline accesses any register in the first and second subsets of the distributed GPRs as part of the processor's GPRs during instruction execution in the processor, wherein the second subset of the distributed GPRs is accessed through the first conductor. In one aspect, the instruction execution pipeline includes an instruction fetch unit, an instruction decode unit, one or more execution units, and a load/store unit, wherein any register in the first and second subsets of the distributed GPRs is accessible by the one or more execution units and the load/store unit as needed during instruction execution in the processor. In another aspect, the processor includes execution units configured to execute the instructions, the execution units including at least one of a group consisting of: an arithmetic-logic unit (ALU) configured to perform arithmetic and logic operations, a multiply-accumulate unit (MAC) configured to perform multiply-accumulate operations, a floating point unit (FPU) configured to perform floating point number operations, and a conditional status register unit configured to perform comparison operations. In another aspect, the processing system further includes a co-processor unit, wherein the second subset of the distributed GPRs is located in the co-processor unit, the first set of conductors is directly connected between the processor and the second subset of the distributed GPRs in the co-processor unit, and the co-processor unit directly accesses the second subset of the distributed GPRs. In a further aspect, the processing system further includes a third subset of the distributed GPRs; a second set of conductors; and a peripheral unit, wherein the third subset of the distributed GPRs is located in the peripheral unit, the second set of conductors is directly connected between the processor and the third set of conductors, and the peripheral unit directly accesses the third subset of the distributed GPRs. In another aspect, the processing system further includes a memory device coupled to the interconnect; when operands are needed from a source address location in the memory device, the load/store unit obtains the operands by way of the bus interface unit and the system interconnect and stores the operands into one of the first or second subsets of the distributed GPRs; and when results from one of the execution units are written to a destination address location in the memory device, the load/store unit provides the results by way of the bus interface unit and the system interconnect. In another aspect, the one or more execution units retrieve operands directly from the first and second subsets of the distributed GPRs; and the execution units write results directly to the first and second subsets of the distributed GPRs. In yet another aspect, the processor is a RISC processor that implements a RISC-V instruction set architecture. In another aspect, the first subset of the distributed GPRs is reserved for compiled code, such that compiled code for the processor includes references to the first subset but not references to the second subset. In a further aspect, one of the peripheral and coprocessor units include one of a group consisting of: an encryption engine, a transmitter/receiver of a wireless controller, a direct memory access engine, and a data converter.

In another embodiment, a processor system includes a processor that includes control circuitry and at least one instruction execution unit; a set of distributed general purpose registers (DGPRs) including a first subset of the set of the DGPRs in the processor, and a second subset of the set of the DGPRs external to the processor; a set of conductors connected directly between the processor and the second subset of the DGPRs; a system interconnect coupled to the processor; and a memory device coupled to the system interconnect, wherein during execution of instructions by the processor, the control circuitry and the at least one execution unit access the first subset of the DGPRs directly, accesses the second subset of the DGPRs through the set of conductors without using the system interconnect, and the control circuitry accesses the memory device via the system interconnect. In one aspect, the processing system further includes a co-processor that includes the second subset of the DGPRs and a set of other general purpose registers, and is coupled to the system interconnect. In a further aspect, the processing system further includes a third subset of the DGPRs external to the processor; a second set of conductors coupled between the processor and the third subset of the DGPRs; and a peripheral that includes the third subset of the DGPRs and a set of other general purpose registers, and is coupled to the system interconnect, wherein the control circuitry and the at least one execution unit access the second subset of the DGPRs through the second set of conductors without using the system interconnect. In another aspect, the processor can only access the set of other general purpose registers of the co-processor using the system interconnect. In yet another aspect, the processor can only access the set of other general purpose registers of the co-processor and the set of other general purpose registers of the peripheral using the system interconnect. In another aspect, one of the peripheral processor and the coprocessor include one of a group consisting of: an encryption engine, a transmitter/receiver of a wireless controller, a direct memory access engine, and a data converter.

In yet another embodiment, a method of accessing distributed general purpose registers (DGPRs) in a processing system includes executing instructions in a processor; accessing a first subset of the DGPRs in the processor while executing the instructions; and accessing a second subset of the DGPRs by the processor while executing the instructions, wherein the second subset of the DGPRs are included in another processor external to the processor, and the processor is directly connected to the second subset of the DGPRs with a set of conductors to enable access to the second subset of the DGPRs by the processor without use of a system interconnect. In one aspect, the method further includes accessing source and destination addresses in a memory device external to the processor through the system interconnect. In another aspect, the method further includes using an instruction pipeline of the processor to fetch and decode the instructions, wherein the instruction pipeline includes one or more execution units which can access any register in the first or second submit of the DGPRs during instruction execution. In a further aspect, the one or more execution units retrieving operands directly from any register in the first or second subset of the DGPRs; and the one or more execution units writing results directly to any register of the first or second subset of the DGPRs.

What is claimed is:

1. A processing system comprising:
 a system interconnect;
 a processor coupled to communicate with other components in the processing system through the system interconnect;
 distributed general purpose registers (GPRs) in the processing system, wherein a first subset of the distributed GPRs is located in the processor and a second subset of the distributed GPRs is located in the processing system and external to the processor;
 a first set of conductors directly connected between the processor and the second subsets of the distributed GPRs; and
 an instruction execution pipeline in the processor, wherein the instruction execution pipeline accesses any register in the first and second subsets of the distributed GPRs as part of the processor's GPRs during instruction execution in the processor, wherein the second subset of the distributed GPRs is accessed through the first conductor,
 wherein the processor includes execution units configured to execute the instructions, the execution units including at least one of a group consisting of: an arithmetic-logic unit (ALU) configured to perform arithmetic and logic operations, a multiply-accumulate unit (MAC) configured to perform multiply-accumulate operations, a floating point unit (FPU) configured to perform floating point number operations, and a conditional status register unit configured to perform comparison operations, wherein:
  the execution units retrieve operands directly from the first and second subsets of the distributed GPRs; and
  the execution units write results directly to the first and second subsets of the distributed GPRs.

2. The processing system of claim 1, wherein the instruction execution pipeline includes:

an instruction fetch unit, an instruction decode unit, one or more execution units, and a load/store unit, wherein any register in the first and second subsets of the distributed GPRs is accessible by the one or more execution units and the load/store unit as needed during instruction execution in the processor.

3. The processing system of claim 1 further comprising:
a co-processor unit, wherein the second subset of the distributed GPRs is located in the co-processor unit, the first set of conductors is directly connected between the processor and the second subset of the distributed GPRs in the co-processor unit, and the co-processor unit directly accesses the second subset of the distributed GPRs.

4. A processing system comprising:
a system interconnect;
a processor coupled to communicate with other components in the processing system through the system interconnect, wherein the processor is a RISC processor that implements a RISC-V instruction set architecture;
distributed general purpose registers (GPRs) in the processing system, wherein a first subset of the distributed GPRs is located in the processor and a second subset of the distributed GPRs is located in the processing system and external to the processor;
a first set of conductors directly connected between the processor and the second subsets of the distributed GPRs;
an instruction execution pipeline in the processor, wherein the instruction execution pipeline accesses any register in the first and second subsets of the distributed GPRs as part of the processor's GPRs during instruction execution in the processor, wherein the second subset of the distributed GPRs is accessed through the first conductor;
a co-processor unit, wherein the second subset of the distributed GPRs is located in the co-processor unit, the first set of conductors is directly connected between the processor and the second subset of the distributed GPRs in the co-processor unit, and the co-processor unit directly accesses the second subset of the distributed GPRs;
a third subset of the distributed GPRs;
a second set of conductors; and
a peripheral unit, wherein the third subset of the distributed GPRs is located in the peripheral unit, the second set of conductors is directly connected between the processor and the third subset of distributed GPRs, and the peripheral unit directly accesses the third subset of the distributed GPRs.

5. A processing system comprising:
a system interconnect;
a processor coupled to communicate with other components in the processing system through the system interconnect, wherein the processor is a RISC processor that implements a RISC-V instruction set architecture;
distributed general purpose registers (GPRs) in the processing system, wherein a first subset of the distributed GPRs is located in the processor and a second subset of the distributed GPRs is located in the processing system and external to the processor;
a first set of conductors directly connected between the processor and the second subsets of the distributed GPRs;
an instruction execution pipeline in the processor, wherein the instruction execution pipeline accesses any register in the first and second subsets of the distributed GPRs as part of the processor's GPRs during instruction execution in the processor, wherein the second subset of the distributed GPRs is accessed through the first conductor, and wherein the instruction execution pipeline includes:
an instruction fetch unit, an instruction decode unit, one or more execution units, and a load/store unit, wherein any register in the first and second subsets of the distributed GPRs is accessible by the one or more execution units and the load/store unit as needed during instruction execution in the processor; and
a memory device coupled to the interconnect, wherein:
when operands are needed from a source address location in the memory device, the load/store unit obtains the operands by way of the bus interface unit and the system interconnect and stores the operands into one of the first or second subsets of the distributed GPRs; and
when results from one of the execution units are written to a destination address location in the memory device, the load/store unit provides the results by way of the bus interface unit and the system interconnect.

6. A processing system comprising:
a system interconnect;
a processor coupled to communicate with other components in the processing system through the system interconnect, wherein the processor is a RISC processor that implements a RISC-V instruction set architecture;
distributed general purpose registers (GPRs) in the processing system, wherein a first subset of the distributed GPRs is located in the processor and a second subset of the distributed GPRs is located in the processing system and external to the processor;
a first set of conductors directly connected between the processor and the second subsets of the distributed GPRs; and
an instruction execution pipeline in the processor, wherein the instruction execution pipeline accesses any register in the first and second subsets of the distributed GPRs as part of the processor's GPRs during instruction execution in the processor, wherein the second subset of the distributed GPRs is accessed through the first conductor.

7. A processing system comprising:
a system interconnect;
a processor coupled to communicate with other components in the processing system through the system interconnect, wherein the processor is a RISC processor that implements a RISC-V instruction set architecture;
distributed general purpose registers (GPRs) in the processing system, wherein a first subset of the distributed GPRs is located in the processor and a second subset of the distributed GPRs is located in the processing system and external to the processor;
a first set of conductors directly connected between the processor and the second subsets of the distributed GPRs; and
an instruction execution pipeline in the processor, wherein the instruction execution pipeline accesses any register in the first and second subsets of the distributed GPRs as part of the processor's GPRs during instruction execution in the processor, wherein the second subset of the distributed GPRs is accessed through the first conductor, wherein the first subset of the distributed GPRs is reserved for compiled code, such that compiled code for the processor includes references to the first subset but not references to the second subset.

8. The processing system of claim 4 wherein:

one of the peripheral and coprocessor units include one of a group consisting of: an encryption engine, a transmitter/receiver of a wireless controller, a direct memory access engine, and a data converter.

9. A processing system comprising:

a processor that includes control circuitry and at least one instruction execution unit;

a set of distributed general purpose registers (DGPRs) including a first subset of the set of the DGPRs in the processor, and a second subset of the set of the DGPRs external to the processor;

a set of conductors connected directly between the processor and the second subset of the DGPRs;

a system interconnect coupled to the processor;

a memory device coupled to the system interconnect;

a co-processor that includes the second subset of the DGPRs and a set of other general purpose registers, and is coupled to the system interconnect;

a third subset of the DGPRs external to the processor;

a second set of conductors coupled between the processor and the third subset of the DGPRs; and a peripheral that includes the third subset of the DGPRs and a set of other general purpose registers, and is coupled to the system interconnect, wherein the control circuitry and the at least one execution unit access the second subset of the DGPRs through the second set of conductors without using the system interconnect;

wherein during execution of instructions by the processor, the control circuitry and the at least one execution unit access the first subset of the DGPRs directly, accesses the second subset of the DGPRs through the set of conductors without using the system interconnect, and the control circuitry accesses the memory device via the system interconnect.

10. The processing system of claim 9 wherein:

the processor can only access the set of other general purpose registers of the co-processor using the system interconnect.

11. The processing system of claim 9 wherein:

the processor can only access the set of other general purpose registers of the co-processor and the set of other general purpose registers of the peripheral using the system interconnect.

12. The processing system of claim 9 wherein:

one of the peripheral processor and the coprocessor include one of a group consisting of: an encryption engine, a transmitter/receiver of a wireless controller, a direct memory access engine, and a data converter.

* * * * *